United States Patent
Sue et al.

(10) Patent No.: US 6,392,190 B1
(45) Date of Patent: May 21, 2002

(54) AUTOMATED HARDFACING SYSTEM

(75) Inventors: J. Albert Sue; Zhigang Fang, both of The Woodlands; Alysia Canson White, Kingwood, all of TX (US)

(73) Assignee: Smith International, Houston, TX (US)

( * ) Notice: Subject to any disclaimer, the term of this patent is extended or adjusted under 35 U.S.C. 154(b) by 0 days.

(21) Appl. No.: 09/153,676

(22) Filed: Sep. 15, 1998

Related U.S. Application Data (60) Provisional application No. 60/072,275, filed on Jan. 23, 1998.

(51) Int. Cl.[7] ............................................. B23K 10/00
(52) U.S. Cl. ........................ 219/121.59; 219/121.47; 219/76.16; 219/121.54; 427/446; 427/445; 175/375; 175/327
(58) Field of Search ....................... 219/121.47, 121.59, 219/121.39, 121.45, 121.48, 76.15, 76.16; 175/378, 375, 374, 376, 425, 327, 426; 427/446, 455, 569

(56) References Cited

U.S. PATENT DOCUMENTS

| | | | |
|---|---|---|---|
| 4,396,077 A | * 8/1983 | Radtke ......................... 175/329 |
| 4,397,893 A | 8/1983 | Bottoms ...................... 427/319 |
| 4,458,628 A | 7/1984 | Fujii et al. ................... 118/697 |
| 4,471,003 A | 9/1984 | Cann ........................... 427/34 |
| 4,596,718 A | 6/1986 | Gruner ........................ 427/34 |
| 4,667,621 A | 5/1987 | Kusunoki et al. ............ 118/687 |
| 4,670,290 A | 6/1987 | Itoh et al. .................... 427/34 |
| 4,785,528 A | 11/1988 | Soderberg .................... 29/701 |
| 4,864,966 A | 9/1989 | Anderson et al. ........... 118/668 |
| 4,866,241 A | * 9/1989 | Doherty et al. ......... 219/121.47 |
| 4,970,091 A | 11/1990 | Buhrmaster et al. .......... 427/34 |
| 4,982,067 A | 1/1991 | Marantz et al. ........ 219/121.47 |
| 5,052,331 A | 10/1991 | Buhrmaster et al. ........ 118/50.1 |
| 5,105,147 A | 4/1992 | Karasikov et al. ........ 324/158 F |
| 5,141,165 A | 8/1992 | Sharpless et al. ............ 239/752 |
| 5,144,110 A | 9/1992 | Marantz et al. ......... 219/121.48 |
| 5,192,593 A | 3/1993 | Matsuo et al. ............... 427/421 |
| 5,197,846 A | 3/1993 | Uno et al. .................... 414/731 |
| 5,233,150 A | 8/1993 | Schneebeli et al. ....... 219/76.14 |
| 5,250,780 A | 10/1993 | Hansz et al. ........... 219/121.49 |
| 5,254,359 A | 10/1993 | Zurecki et al. .............. 477/449 |
| 5,254,923 A | 10/1993 | Kanitani ................. 318/568.11 |
| 5,314,722 A | 5/1994 | Kobayashi ................... 427/425 |
| 5,441,624 A | 8/1995 | Chan et al. ............. 204/298.41 |
| 5,545,873 A | 8/1996 | Sauer ...................... 219/124.03 |
| 5,580,429 A | 12/1996 | Chan et al. ............. 204/192.38 |
| 5,674,570 A | 10/1997 | Fouvet ........................ 427/421 |
| 5,866,872 A | * 2/1999 | Lu et al. ................ 219/121.56 |

FOREIGN PATENT DOCUMENTS

| GB | 0 254 171 A | 9/1993 |
| GB | 2 311 085 A | 9/1997 |

OTHER PUBLICATIONS

Great Britain Search Report, Mar. 11, 1999, pages.

* cited by examiner

*Primary Examiner*—Mark Paschall
(74) *Attorney, Agent, or Firm*—Rosenthal & Osha L.L.P.

(57) ABSTRACT

An automated hardfacing system useful for hardfacing roller cones is disclosed. The automated system includes a robot with an arm, a positioner, and a controller which co-ordinates the alignment of the robot and the positioner. The robot holds a hardfacing torch and is capable of movement in three axes of movement. These axes are the x, y, and z axes of the Cartesian co-ordinate system. The positioner holds a roller cone and is capable of movement in at least two axes of movement. The movement includes tilting and rotation about a Cartesian axis. The hardfacing coating produced by the automated system has improved quality and consistency as compared to the one obtained by a manual process.

18 Claims, 7 Drawing Sheets

AUTOMATED HARDFACING SYSTEM

CROSS-REFERENCE TO RELATED APPLICATIONS

This application claims to the benefit of U.S. Provisional Application No. 60/072,275, entitled "Forming Hardfacing Coatings by Pulsed Plasma-Transferred Arc," filed Jan. 23, 1998.

FIELD OF THE INVENTION

The invention relates to an automated apparatus and method for forming a hardfacing coating on a work piece with complex geometry and more particularly to an automated apparatus and method for deposition of a hardfacing layer on a roller cone of a drill bit.

BACKGROUND OF THE INVENTION

Figure 1:
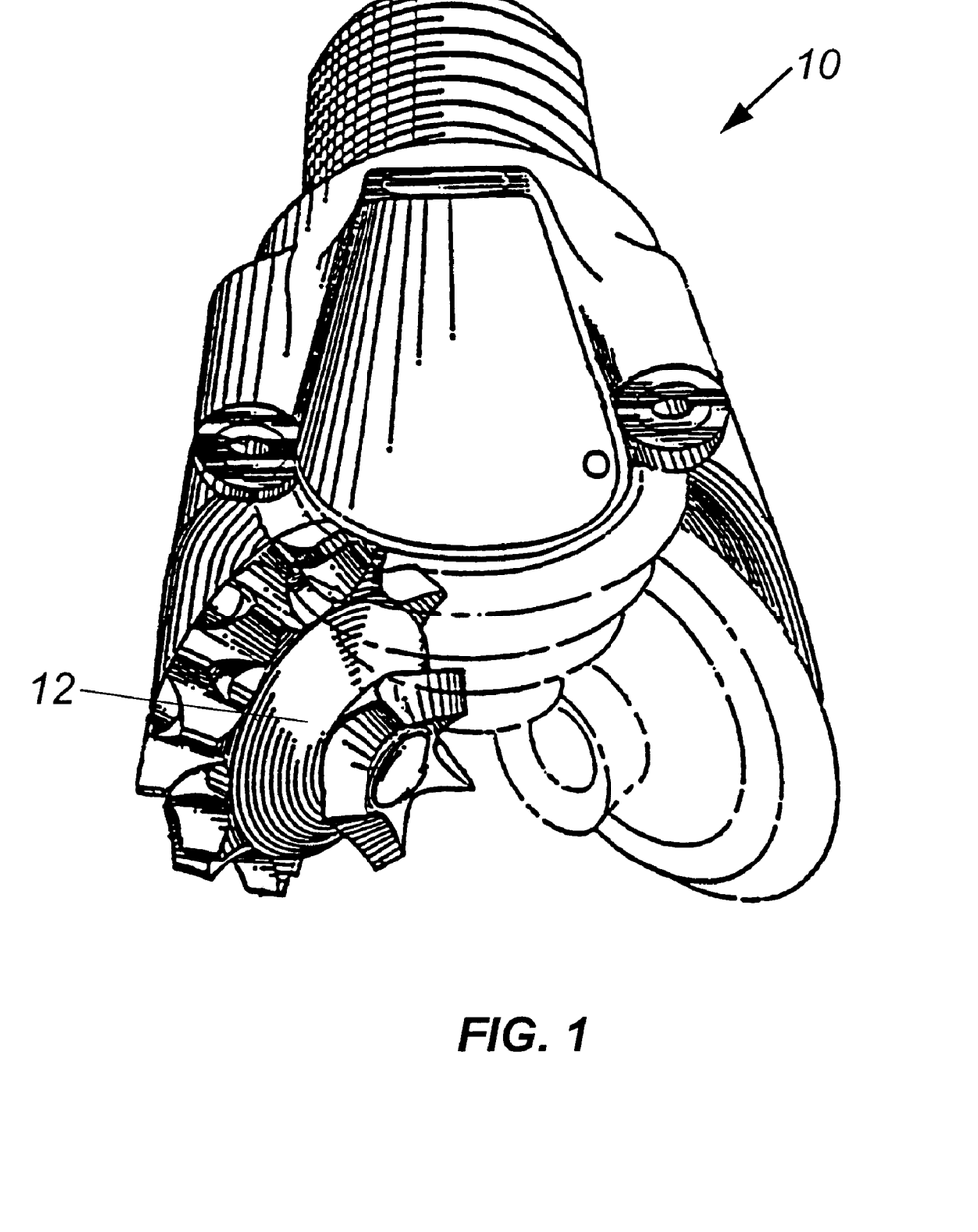
FIG. 1 is a partial cut-away view of a drill bit with three milled-tooth cones.

Certain drill bits, also known as rock bits, are commonly used for drilling oil wells in petroleum applications and for drilling blast holes for blasting in mining applications. Various types of rock bits have been developed over the years. One type of rock bit is called a milled-tooth bit, which includes a bit body and one or more milled tooth cones. A typical milled-tooth bit with three milled-tooth cones is illustrated in FIG. 1.

A typical milled-tooth bit 10 includes three separate milled-tooth cones 12 which are attached to the bit body. Each cone 12 has a plurality of teeth protruding from the surface of the cone. The entire milled-tooth cone, including the teeth, typically is manufactured from a piece of steel. During operation, the bit is attached to a drill string (not shown) and the cones are in contact with an earthen formation. As the drill string rotates the bit, the three milled-tooth cones 12 also rotate around their respective axes.

Under normal drilling conditions, the relatively soft steel teeth of a milled-tooth cones are exposed to substantial abrasion and loading. This abrasion and loading can result in significant erosion and impact wear on the teeth. The wear on the teeth ultimately results in a reduction in the penetration rate of the drill bit and a shortened life of the drill bit.

A solution to the lack of wear resistance is to deposit a coating of wear-resistant material on the surfaces of the teeth. This process is sometimes referred to in the art as "hardfacing." Typical wear resistant material used in hardfacing includes tungsten carbide particles in a metal matrix. Deposition of the hardfacing material typically is accomplished using a manual welding process, such as oxyacetylene welding (OAW), atomic hydrogen welding, etc. In a manual process, a person holding a welding torch and a rod of hardfacing material will apply a coating of the hardfacing material to the surface of a tooth by welding. After one tooth has been coated, the person moves the torch, the hardfacing material, and/or the cone to permit the next tooth to be coated.

However, manual processes do not always produce satisfactory hardfacing coatings on milled teeth. Quality characteristics of a hardfacing coating are indicated, in part, by the thickness, uniformity, and coverage of the hardfacing coating on the tooth. The quality also is affected by the porosity of and the oxide and eta phase content in the coating. In a manual process, the consistency of these characteristics varies from operator to operator and even from time to time for the same operator. Sometimes the quality of a hardfacing coating may differ significantly from one tooth to another on the same cone.

An automated hardfacing system would provide a significant advantage by producing consistent quality characteristics during the hardfacing process. The improved quality of hardfacing of a cone may result in an increased penetration rate of the drill bit and ultimately lead to a longer drilling bit life. However, due to the complex geometry, inaccessibility to the faces of each tooth by a hardfacing torch, and the number of teeth on a milled-tooth cone, an automated hardfacing system for a rock bit has not been available because it is an enormous challenge to develop an automated hardfacing system capable of properly hardfacing some or all of the desired surfaces of each tooth.

For the foregoing reasons, there is an unfulfilled need in the art for an automated hardfacing system which is capable of producing consistent hardfacing coating on a work piece with complex geometry, such as a milled-tooth cone.

SUMMARY OF THE INVENTION

In one aspect, the invention relates to an apparatus for hardfacing a roller cone of a drill bit. The apparatus includes (1) a positioner having n axis (axes) of movement; (2) a holder having m axis (axes) of movement, wherein m+n≧5; (3) a roller cone with a protruding tooth mounted on the holder; and (4) a controller which co-ordinates the movement of the positioner and the holder to deposit a hardfacing composition on an area of the roller cone. In some embodiments, the roller cone includes milled teeth or tungsten carbide inserts. In other embodiments, the roller cone includes a land or a groove on the cone surface, and the hardfacing composition is deposited on the land or the groove.

In another aspect, the invention relates to an apparatus for hardfacing a milled-tooth cone of a drill bit. The apparatus includes (1) a positioner having n axis (axes) of movement; (2) a holder having m axis (axes) of movement, wherein m+n≧5; (3) a milled-tooth cone with a tooth mounted on the positioner; and (4) a controller which co-ordinates the movement of the positioner and the holder to deposit a hardfacing composition on the tooth of the milled-tooth cone. Alternatively, the milled-tooth cone may be mounted on the holder. In some embodiments, the apparatus may further include a hardfacing torch which is mounted either on the holder or on the positioner. In other embodiments, the controller may control a hardfacing torch travel speed, a hardfacing torch weave pattern, and a hardfacing torch stand-off distance from the milled-tooth cone. Furthermore, the controller may control a hardfacing composition, a hardfacing composition feed rate, an arc current, a voltage, and a gas flow rate. In some embodiments, the hardfacing composition is deposited on the tooth of the milled-tooth cone by a plasma transferred arc process, a pulsed plasma transferred arc process, a metal inert gas arc process, or a gas tungsten arc welding process. In other embodiments, the tooth may include a crest face, a leading face, a trailing face, an outside face, and an inside face, and the hardfacing composition may be deposited on the crest face and the leading face of the tooth. In other embodiments, the hardfacing composition may be deposited on the crest face, the leading face, the trailing face, the outside face, and the inside face of the tooth.

In one aspect, the invention relates to an apparatus for hardfacing a milled-tooth cone of a drill bit. The apparatus includes (1) a positioner holding a milled-tooth cone where the positioner has at least two axes of movement and the milled-tooth cone has a plurality of protruding steel teeth; (2) a robot holding a hardfacing torch where the robot has at least three axes of movement and the hardfacing torch is connected to a hardfacing composition including tungsten carbide and a metal matrix; (3) a robot controller which co-ordinates the movement of the positioner and the robot such that the hardfacing composition is deposited on the steel teeth of the milled-tooth cone by a pulsed plasma transferred arc process; and (4) a hardfacing torch controller which controls a hardfacing composition feed rate, a hardfacing torch travel speed, a hardfacing torch weave pattern, and a hardfacing torch stand-off distance from the milled-tooth cone.

In another aspect, the invention relates to an apparatus for hardfacing a roller cone of a drill bit. The apparatus includes (1) a roller cone having a protruding tooth; (2) means for holding the roller cone having m axis (axes) of movement; (3) means for holding a hardfacing torch having n axis (axes) of movement, wherein m+n>5; (4) means for automatically controlling the movement of the roller cone and the hardfacing torch; and (5) means for depositing a hardfacing composition on the tooth of the roller cone.

In another aspect, the invention relates to a method for hardfacing a roller cone of a drill bit. The method includes (1) providing a roller cone having a protruding tooth and a hardfacing torch; (2) moving the roller cone by using a first apparatus having m axis (axes) of movement; (3) moving the hardfacing torch by using a second apparatus having n axis (axes) of movement, wherein m+n≧25; and (4) depositing a hardfacing composition on the tooth of the roller cone with the hardfacing torch.

In yet another aspect, the invention relates to a method for hardfacing a milled-tooth cone of a drill bit. The method includes (1) providing a milled-tooth steel cone having a plurality of steel teeth where each steel tooth has at least one face; (2) providing a hardfacing torch having a tip; (3) moving the milled-tooth steel cone by a positioner; (4) moving the hardfacing torch tip to an area adjacent to the face of a steel tooth of the milled-tooth cone by a robot; (5) forming a plasma column between the hardfacing torch tip and the face of the steel tooth; (6) feeding a hardfacing composition into the plasma column; (7) pulsing an electrical current at a pulse rate to deposit a layer of the hardfacing composition on the face of the steel tooth; and (8) controlling the pulsing of the electrical current to minimize the formation of a weld pool on the face. The hardfacing composition is deposited on the steel teeth by coordinating the movement of the positioner and the holder.

In another aspect, the invention relates to a hardfaced roller cone manufactured by the following method. The method includes (1) providing a hardfacing torch and a roller cone having a protruding tooth; (2) moving the roller cone by using a positioner having m axis (axes) of movement; (3) moving the hardfacing torch by using a holder having n axis (axes) of movement, wherein m+n≧5; and (4) depositing a hardfacing composition on the tooth of the roller cone with the hardfacing torch. In some embodiments, the tooth is formed of steel. In some embodiments, the hardfacing composition may include tungsten carbide and a metal matrix. The hardfacing composition may be deposited by a transferred plasma arc process, a pulsed transferred plasma arc process, a metal insert gas arc process, or a gas tungsten arc welding process.

In yet another aspect, the invention relates to a rock bit which includes a bit body having a leg and a hardfaced roller cone rotatably mounted on the leg. The hardfaced roller cone is manufactured by the following method: (1) providing a hardfacing torch and a roller cone having a protruding tooth; (2) moving the roller cone by using a positioner having m axis (axes) of movement; (3) moving the hardfacing torch by using a holder having n axis (axes) of movement, wherein m+n≧5; and (4) depositing a hardfacing composition on the tooth of the roller cone with the hardfacing torch.

DETAILED DESCRIPTION OF PREFERRED EMBODIMENTS

Embodiments of the invention provide an automated system for hardfacing a work piece with complex geometry, such as a milled-tooth cone. The automated system includes a positioner having n axis (axes) of movement, a holder having m axis (axes) of movement, a roller cone with a protruding tooth mounted on either the positioner or the holder, and a controller which co-ordinates the movement of the positioner and the holder to deposit a hardfacing composition on the tooth of the roller cone. In the automated hardfacing system, the sum of m+n is equal to or greater than 5. The automated hardfacing system is capable of producing hardfaced milled-tooth cone with consistent quality.

The embodiments of the invention are based, in part, on the realization that a minimum of five movement axes is preferred to automate the process of hardfacing a milled-tooth cone. A movement axis is defined as an axis to which the direction of a physical motion is referenced. In reference to an axis, a physical body may move linearly along the axis, or move angularly around the axis. Angular motion includes tilt and rotation. Therefore, a movement axis may be a linear-motion axis, a tilt axis or a rotation axis. It is found that a combination of linear motion and angular motion is preferred to hardface a milled-tooth cone.

Figure 2:
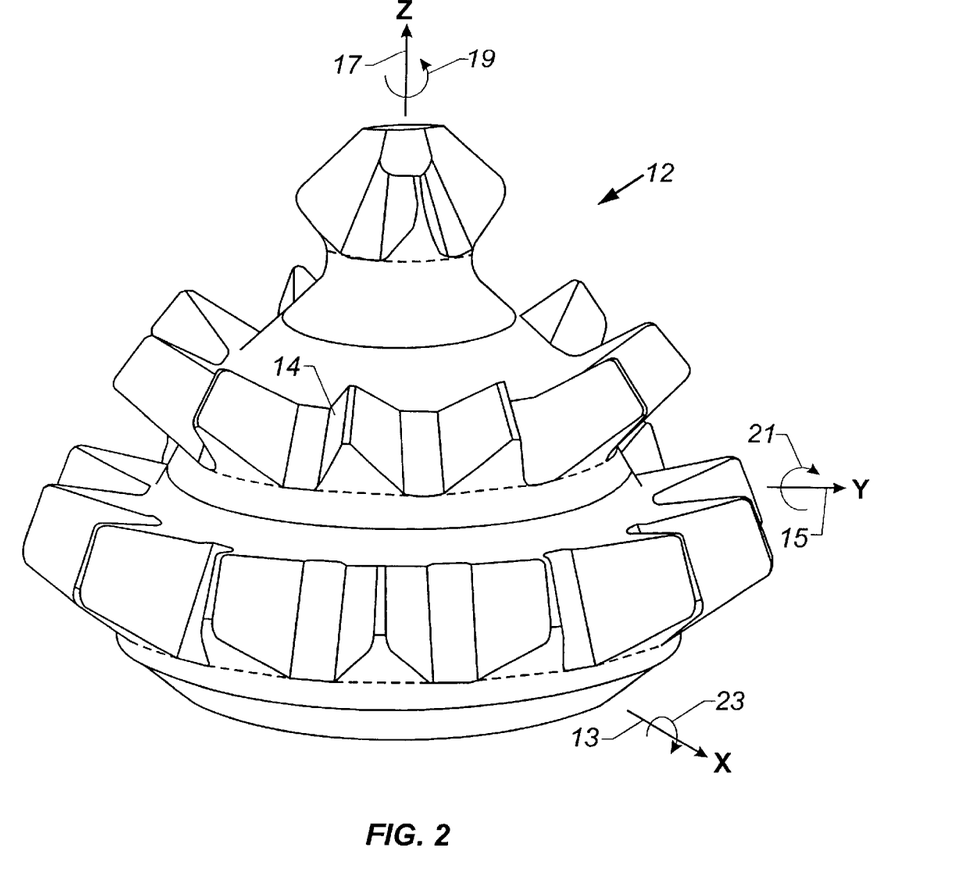
FIG. 2 is a perspective view of a milled-tooth cone with three separate rows of milled teeth placed in the Cartesian coordinate system.

Referring to FIG. 2, a milled-tooth cone 12 is placed in an orthogonal Cartesian coordinate system having x, y, and z axes. The cone generally has several rows of teeth 14. The exact number of rows and teeth will vary with different embodiments of the cones. The z axis 17 is in the direction of the cone nose. The x axis 13 and y axis 15 define a plane that parallels the plane defined by the row of steel teeth.

Figure 3:
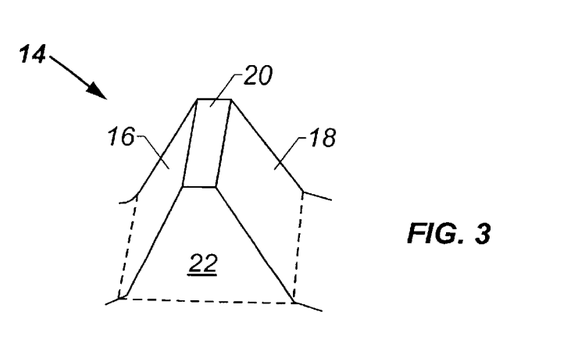
FIG. 3 is a perspective view of a single milled-tooth.

As shown in FIG. 3, each tooth 14 in this embodiment has five separate surfaces. These surfaces include a leading flank face 16, a trailing flank face 18, a crest face 20, and an outside face 22. An inside face also is present but not shown in FIG. 3. The inside face is located opposite the outside face 22 and adjacent to the leading flank face 16, the trailing flank face 18, and the crest face 20. However, it should be understood that the exact geometry of the individual milled teeth may vary in different embodiments.

A hardfacing process may start with a hardfacing torch (not shown in FIG. 2) which is located along the z axis and over the nose of the cone 12. If the torch is fixed, the cone 12 should be capable of movement in the x axis, y axis and z axis so that the cone may be placed in a desired location. Furthermore, to move the crest face 20 of the tooth 14 to a position wherein the tip is perpendicular to the crest face, a tilt movement 21 around the y axis 15 is needed. This tilt movement 21 also is capable of moving the outside face 22 and the inside face (not numbered and not shown) to a position where the face is perpendicular to the torch tip. However, to coat the leading flank 18, a tilt movement 23 around the x axis 13 is need to move the leading flank to a position where the surface of this face is perpendicular to the torch tip. Consequently, to hardface all faces of a tooth, the system preferably should be capable of movement about at least five-axes.

After the hardfacing of one tooth is complete, it is necessary to move the cone so that the next tooth can be hardfaced. This may be achieved by rotating the cone 12 around the z axis 17. Such motion is a rotation movement 19. Although this rotation movement is used in preferred embodiments, it is not always necessary because the effect of the rotation movement can be obtained by a combination of movements in the x and y axes.

In some embodiments, the rotation movement 19 and tilt movement 15, along with linear movements in the x, y, and z axes, are used without the tilt movement 23. The effect of the tilt movement 23 can be obtained by a combination of movements in the above-mentioned five axes.

In other embodiments, linear movements in the x, y and z axes, tilt movement 21, tilt movement 23 and rotation movement 19 are employed to hardface a milled-tooth cone. With six-axes movements, it is relatively facile to maneuver the cone during hardfacing. Under some circumstances, it may be desirable to impart an additional tilt movement to the hardfacing torch.

It should be understood that the total number of axes of movement may be distributed in any manner between a hardfacing torch and a milled-tooth cone. For example, a tilt movement and a rotation movement may be allocated to the cone, whereas a plurality of tilt and rotation movements may be assigned to a robot that holds the hardfacing torch. It also should be noted that a plurality of tilt and rotation movements by a robot with multiple joints are capable of moving the torch in the x, y and z axes, tilting the torch, and rotating the torch. As such, it is possible to hold the cone stationary and use the robot to achieve the movements to hardface a cone.

In some embodiments, only the leading flank face 16, the trailing flank face 18, and the crest face 20 of the tooth 14 of FIG. 3 need to be hardfaced. Of these surfaces, the hardfacing of the crest face is most critical. The crest face has direct contact with, and exerts impact loads to, a geological formation. As a result, the integrity of the hardfacing on the crest has a strong effect on the drilling rate of the drill bit. In other embodiments, only the crest face 20 and the leading flank 16 are hardfaced. It generally is preferred that all of the faces of the tooth 14 are overlaid with a uniform layer of hardfacing material.

It should be noted that the sequence by which all of the teeth on a milled-tooth cone are hardfaced may take various forms. For instance, in some embodiments, the teeth are hardfaced one by one, i.e., all desired faces of one tooth are hardfaced before the hardfacing torch moves to the next tooth (or the cone rotates the next tooth to the proper position). In other embodiments, after a designated face (such as the crest face) of a tooth is hardfaced, the cone is rotated so that the same face on the next tooth is hardfaced. The rotation continues until all such faces have been hardfaced. The position of the cone is tilted to position a different face (such as the leading flank face) for hardfacing. Such tilt and rotation continues until all desired faces of all teeth are hardfaced.

Figure 6:
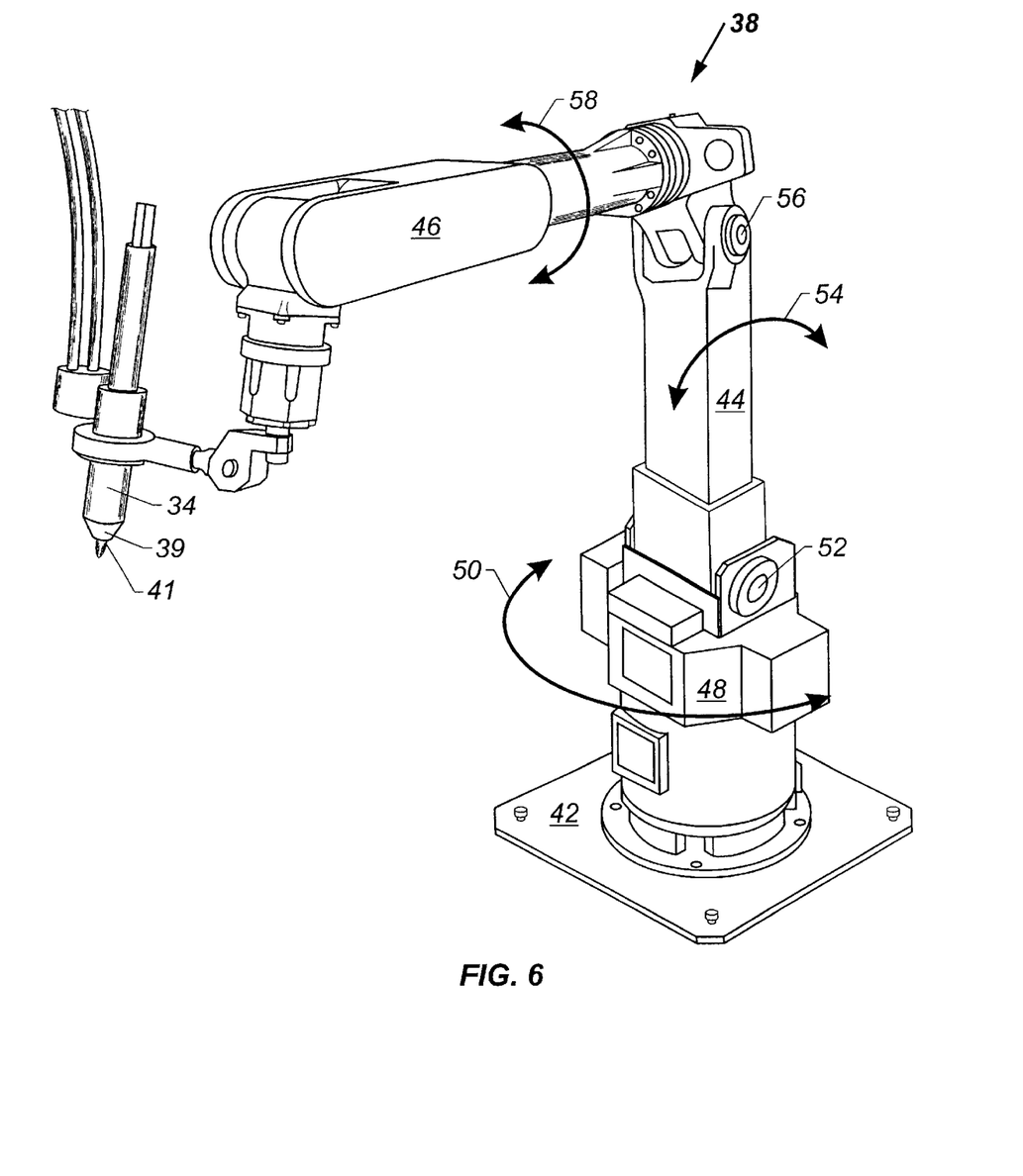
FIG. 6 is a perspective view of a robot with a PPTA torch.
Figure 7:
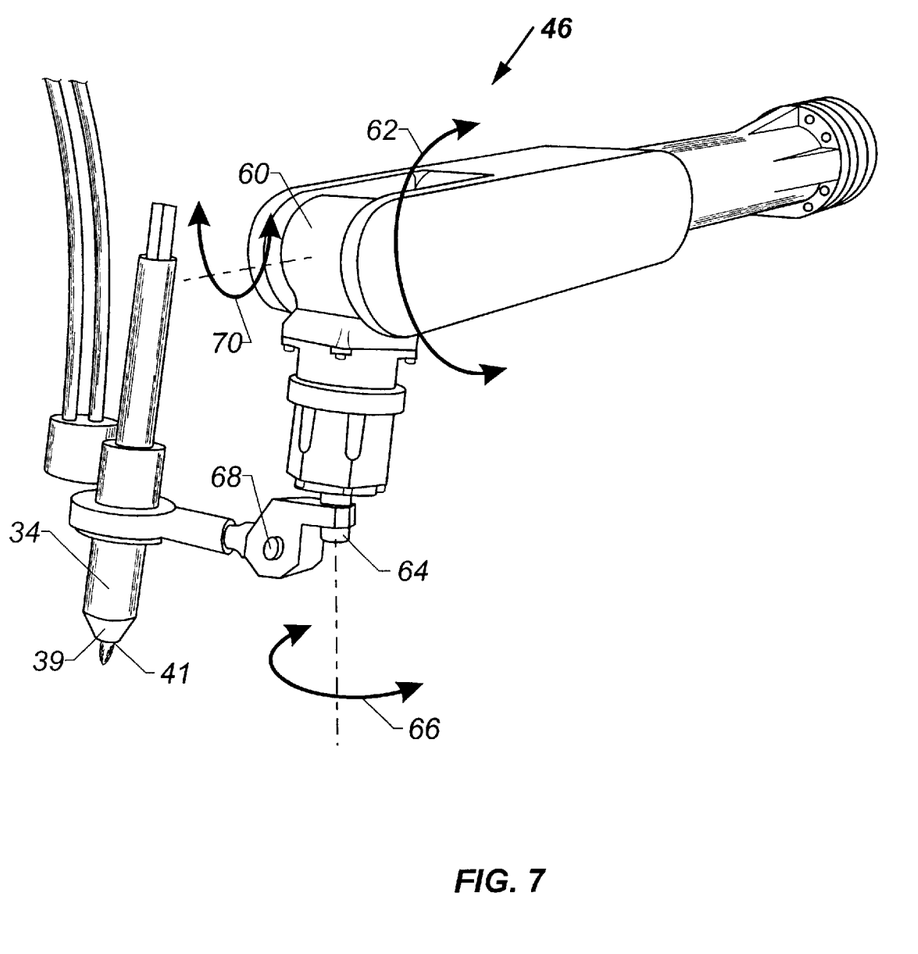
FIG. 7 is a perspective view of a robot arm with a PPTA torch.

Having dealt with the complex geometry of a milled-tooth cone, embodiments of the invention overcome the problem of inaccessibility to the faces of a tooth by a hardfacing torch by modifying the dimension of the torch. A typical prior art hardfacing torch has a cylindrical shape with a tip. A nozzle is located in the tip of the hardfacing torch. The diameter of the torch generally is larger than the spacing between two adjacent teeth. This results in the problem of inaccessibility. In embodiments of the invention, the diameter of the hardfacing torch is reduced, preferably to a size smaller than the space between two adjacent teeth. This size is typically less than 1.5 inches. However, if the torch diameter is too small, the torch might melt during operation due to insufficient heat dissipation. In addition to reduction of the torch diameter, the hardfacing torch tip 39 is modified to a tapered tip or a conical shape as shown in FIGS. 6 and 7. These shapes facilitate torch accessibility to all faces of a tooth so that hardfacing of these faces may be performed automatically. Moreover, the modified torch allows tilting of the torch up to about 35° with respect to the surface normal of the face to be hardfaced. This large tilting angle further increases accessibility.

The hardfacing may be accomplished by any acceptable welding method including (but not limited to) the plasma transferred arc method (PTA), the pulsed-plasma transferred arc method (PPTA), the metal inert gas arc method (MIG), and the gas tungsten arc welding process (TIG).

In a gas-shielding tungsten arc (also known as "gas tungsten arc") welding process, an arc is established between a tungsten or tungsten-thorium electrode and a work piece (such as a milled tooth cone) which generally is grounded through the welding machine. The arc forms a welding pool on the work piece. A hardfacing material in the form of a tube is fed into the weld pool. The tungsten electrode is not consumed. To prevent oxidation and contamination, the heated weld zone, the molten metal, and the non-consumable electrode which carries the welding current are shielded from the ambient atmosphere by an inert gas stream which is directed through a gas passage to the work piece. The electrode holder has an electrical conductor that connects the power supply of the welding machine to the electrode. The electrode holder also includes an insulation sheath. The inert shielding gas may include any inert gas, such as argon, helium, or mixtures thereof. Fusion between the hardfacing material and the surface of a tooth is created by the intense heat of the arc so that a high density hardfacing material is metallurgically bonded to the surface. Typical coating conditions are as follows: the voltage and current for the torch are about 10–20 volts and 60–100 amps; and shielding gas flow rates are in the range of about 20–30 SCFH (Standard Cubic Feet per Hour).

In a metal inert gas arc (also known as "gas metal arc") welding process, a welding gun is connected to a power source, a control unit, and a gas-delivery tubing. The welding gun includes a wire which is supplied by a wire reel through wire drive rolls. The positive terminal of the power source is connected to a work piece (e.g., a milled-tooth cone), and the negative terminal of the power source is connected to the wire so that an electrical arc is generated by passing electrical current between the wire and the work piece. The arc melts the tip of the wire, and droplets of the molten wire are transferred to the surface of the work piece. Contamination of the weld pool by air is prevented by an inert shielding gas which is delivered to the welding gun by the gas-delivery tubing. The flow rate of the shielding gas is monitored and controlled by a flow meter and a valve. The shielding gas may include any inert gas, such as argon, helium, or any mixtures of these gases.

In operation, a small-diameter wire is fed from a wire reel to a welding gun that has a trigger which operates the wire drive rolls, the power supply, and the flow of the shielding gas. In cases where it is not possible to fabricate flexible wire with a sufficient volume content of a hardfacing composition, such as tungsten carbide, tube rods can be fed into the welding gun.

There are four modes of metal transfer in a metal inert gas arc welding process: (1) short circuiting (dip transfer), (2) globular transfer, (3) spray transfer, and (4) pulsed transfer. In short circuiting, i.e., dip transfer, droplets of molten wire are transferred from the tip of the wire to the work piece by frequently short circuiting the wire to the weld pool when a low current and voltage are used. This mode of transfer utilizes low heat input which results in a small, controllable weld pool. Globular transfer occurs when somewhat higher currents and voltages are used than in dip transfer. Under this circumstance, metal transfer still occurs by short circuiting the wire to the weld pool. Spray transfer occurs when the current and voltage are high enough to create a free flight of metal droplets with no short circuiting. This gives maximum transfer rates and deep penetration. In pulsed transfer, molten metal droplets are transferred to the surface of the work piece by pulsing the current between a background current and a high pulse current. Typically, the background current is sufficient to sustain the arc but insufficient for metal transfer, whereas the high pulse current is set above a threshold level to produce sufficient electromotive force for each pulse to transfer one metal droplet from the tip of the wire to the surface of the work piece. As the current is pulsed between the low background current and the high pulse current, the metal droplets are transferred to the work piece. Although any pulse frequency may be used, it is preferred that the pulse rate is around 50 Hz. Although all four of these modes of metal transfer can be used to deposit hardfacing material on rock bit cones, the pulsed transfer mode is preferred because it provides a higher deposition rate with minimal heat generation and thus results in a higher volume content of tungsten carbide in the hardfacing coating.

The pulsed plasma transferred arc process is disclosed in U.S. patent application Ser. No. 09/153,130, filed on Sep. 15, 1998, entitled "Hardfacing Compositions and Hardfacing Coatings Formed by Pulsed Plasma-Transferred Arc." The disclosure of this patent application is incorporated by reference herein in its entirety. A plasma transferred arc process is similar to the pulsed plasma transferred arc process disclosed in the above reference, except that the current is not pulsed in a plasma transferred arc process.

Although any suitable hardfacing composition may be used in embodiments of the invention, compositions based on tungsten carbide are preferred. Such compositions typically include particles of tungsten carbide in a metal matrix such as Fe. Suitable tungsten carbide materials may include spherical cast WC/W$_2$C, sintered WC/Co pellets, crushed sintered WC/Co particles, cast and crushed tungsten carbide, and macrocrystalline tungsten carbide. U.S. Pat. No. 4,836,307 and U.S. Pat. No. 5,051,112 disclose examples of the hardfacing compositions, and the disclosures of the two patents are incorporated by reference herein in their entirety.

It should be noted that suitable hardfacing compositions may be used in the forms of rod, powder, wire, etc. Powder injection is one way of introducing the hardfacing material into the plasma stream. When using powder injection, the preferred method is to inject a mixture of carbide particles and a metal matrix powder into a plasma stream or an arc. However, under some circumstances, it may be desirable to separately inject the carbide particles and the metal matrix powder in separate powder feeders. Furthermore, powder may be fed through the interior of the torch or the exterior of the torch. Alternative embodiments with multiple powder feeders may feed some powders inside the torch while the remaining powders are fed outside the torch.

As an alternative to powder injection, tube rod feeding may be used. The tube rod is made of a metal, such as Fe, and is filled with carbide particles. The rod may be fed into a plasma column or an arc by a mechanical process.

Another method of feeding a hardfacing composition is by use of a wire that is made of a hardfacing composition. Feeding of multiple wires may be employed in some embodiments. Such embodiments may include an additional positioner to maneuver the wire feed into the proper location. The wire may be fed inside a hardfacing torch or outside the torch. In embodiments that use wire-feeding and pulsing, the PPTA controller will synchronize the wire-feeding as well as the pulsing as may be desirable.

Turning to the embodiments which use the PPTA method, it is found that the quality of the hardfacing is dependent on a number of parameters. These parameters include the PPTA torch angle, the electrical current, the electrical voltage, the pulse rate, the shield gas composition and flow rate, the source material feed rate, and the distance between the torch and the surface of a tooth ("stand-off distance"). To some extent, these parameters are interrelated. For example, the electrical voltage is extremely sensitive to the stand-off distance. The typical stand-off distance is 0.375 inch to 0.500 inch (9.5 mm to 12.7 mm). If the stand-off distance is increased beyond this range, the voltage is increased to compensate. This leads to excessive temperature on the deposited material, resulting in the melting of the tungsten carbide particles in the hardfacing material. Conversely, if the stand-off distance is less than the optimum range, the voltage will be decreased to compensate. This leads to excessive porosity in the hardfacing. For example, under a constant current of 110 Amps, a decrease in the stand-off distance by 1 mm results in an increase in voltage from 22 Volts to 24 Volts. In terms of power, this is an increase of more than 200 Watts. Therefore, the stand-off distance is preferably maintained within a 1 mm range of the optimum distance. In contrast, such a fluctuation is difficult to avoid in a manual process because it is almost impossible for an individual welder to maintain the optimum stand-off distance with less than a 1 mm variation.

Figure 4:
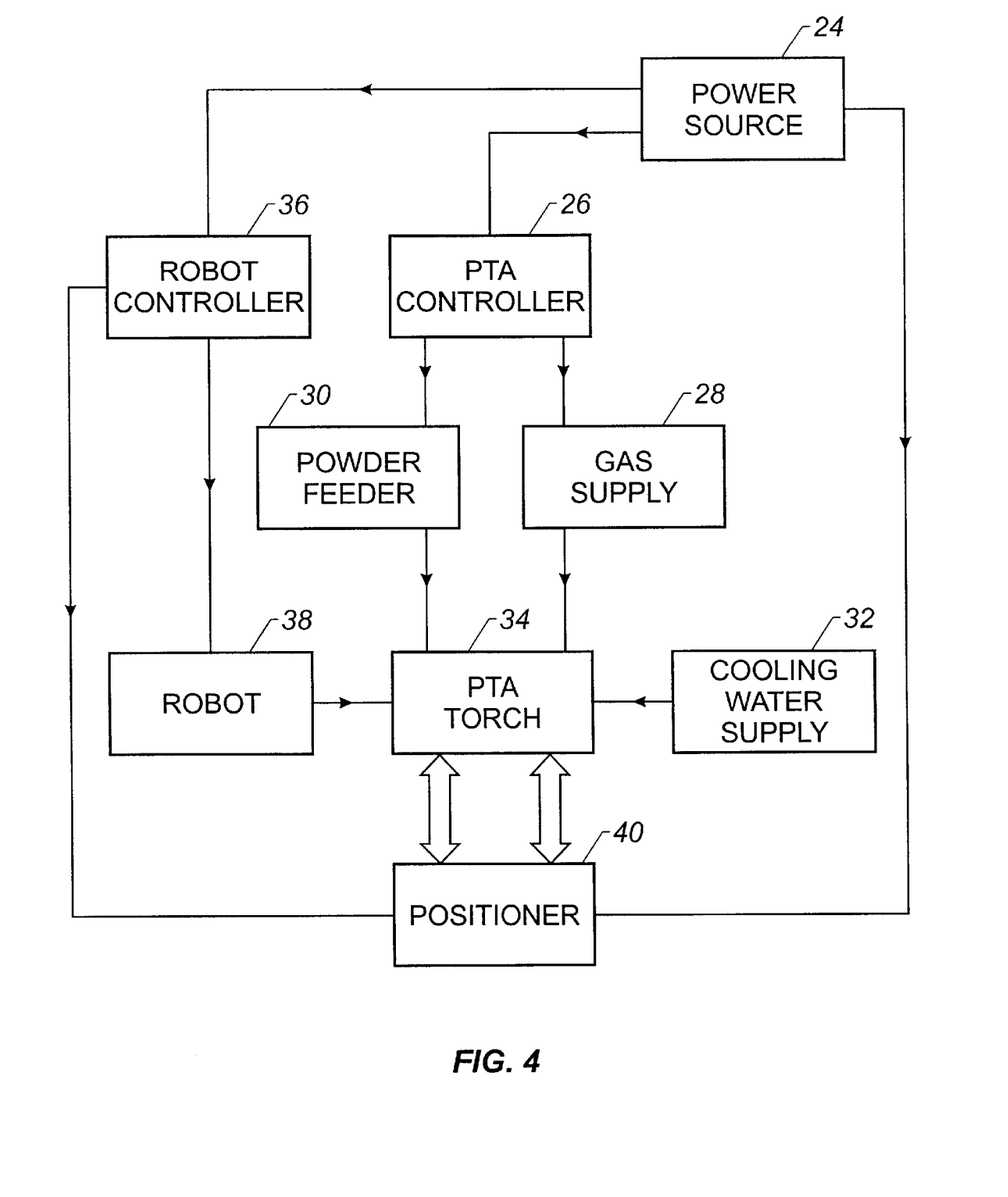
FIG. 4 is a schematic of an embodiment of an automated hardfacing system.
Figure 5:
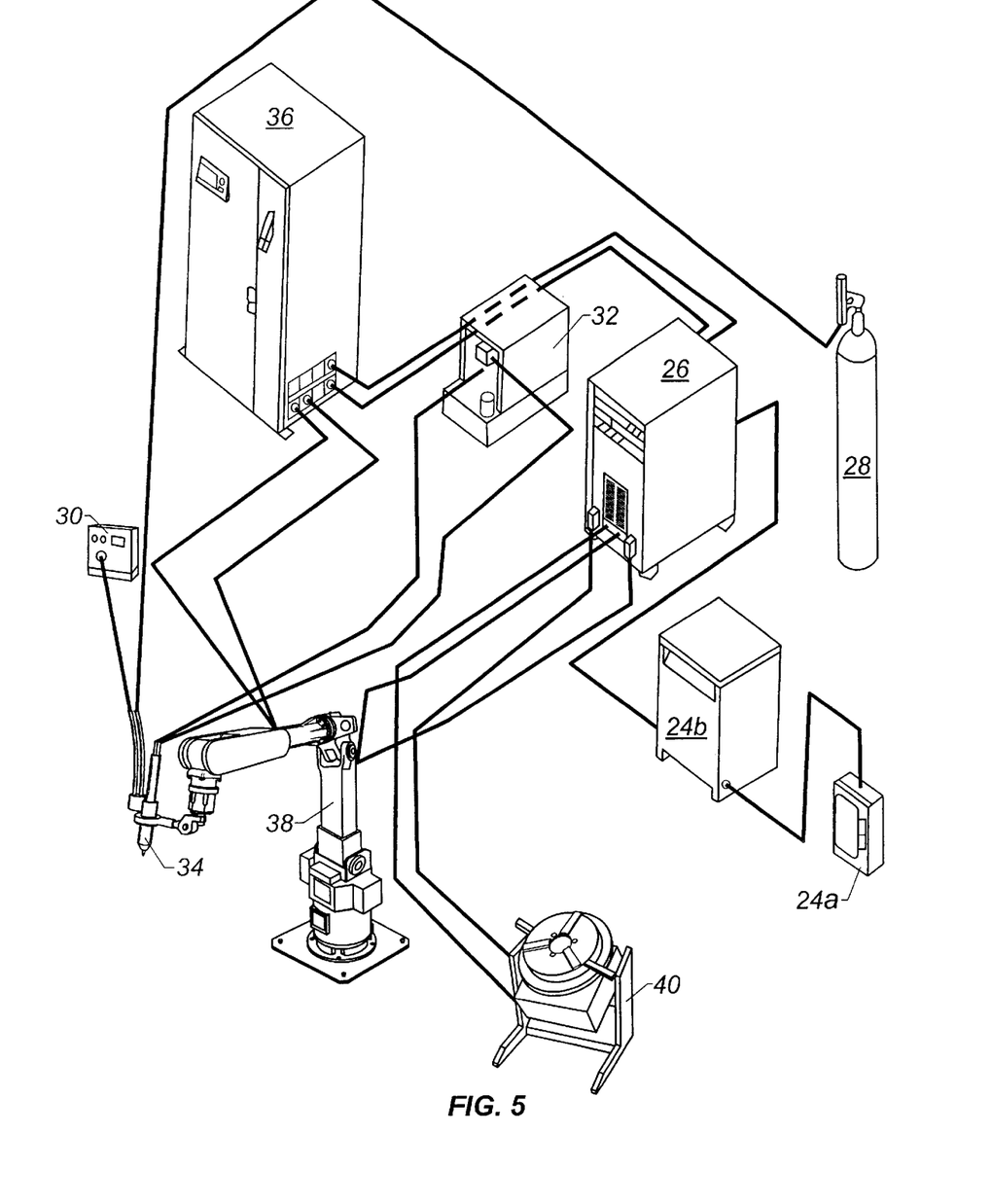
FIG. 5 is a detailed view of an embodiment of an automated hardfacing system.

As to the construction of an automated hardfacing system, an embodiment is shown in FIGS. 4 and 5. FIG. 4 shows a schematic of the system. A power source 24 provides power to a robot controller 36, a PPTA controller 26, and a positioner 40.

In FIG. 5, the power source is depicted as a power distribution box 24a which is connected to a transformer 24b which in turns provides power to the robot controller 36, the PPTA controller 26, and a positioner 40. The PPTA controller controls both the powder feeder 30 (if hardfacing powder is used) and the gas supply 28 which feeds the PPTA torch 34. The PPTA controller additionally co-ordinates and controls a hardfacing composition feed rate, torch travel speed, a torch weave pattern, and torch stand-off distance from the cone, as well as the actual conditions of the PPTA torch itself. These torch conditions include arc current, voltage, plasma gas flow, and shield gas flow. A cooling water supply 32 also is provided to cool the PPTA torch 34.

The robot controller 36 provides operating instruction for both the robot 38 and the positioner 40. In FIG. 4 and 5, the robot 38 holds the PPTA torch 34 while the positioner 40 will hold the milled-tooth cone to be hardfaced. However, in an alternative embodiment, the positioner 40 could hold the PPTA torch 34 and the robot 38 could hold the milled-tooth cone. In either embodiment, the robot controller 36 uses computer software to coordinate the movement of both the robot 38 and the positioner 40 to maintain a constant stand-off distance between the torch and the cone and maintain a constant linear deposition rate. This results in a quality hardfacing surface with a uniform thickness.

FIG. 6 shows a view of one embodiment of the robot 38. The robot 38 comprises a base 42, a lower arm 44 and an upper arm 46. The upper arm 46 holds the PPTA torch 34 on its distant end. The lower arm 44 moves through three separate joints. The first is a swivel joint 48 which is located just above the base 42. The swivel joint 48 allows the lower arm 44 to move in a rotational direction 50 about the swivel axis. The second joint is a lower joint 52 which is located above the swivel joint 48. The lower joint 52 allows the lower arm 44 to move in a rotational direction 54 about the lower joint axis. The third joint is an upper joint 56 which is located above the lower joint 52. The upper joint 56 allows the upper arm 46 to move in a rotational direction 58 about the upper joint axis.

FIG. 7 shows a view of an embodiment of the upper arm 46 of the robot. The PPTA torch 34 is connected to the distant end of the upper arm 46. The upper arm 46 is able to position the PPTA torch 34 in the desired position through three separate joints. The first joint is a rear joint 60 which is located on the distant end of the upper arm 46. The rear joint 60 allows the PPTA torch 34 to move in a rotational direction 62 about the rear joint axis. The second joint is a middle joint 64 which is located adjacent to the rear joint 64. The middle joint 64 allows the PPTA torch 34 to move in a rotational direction 66 about the middle joint axis. The third joint is a forward joint 68 which is located between the middle joint 64 and the PPTA torch 34. The forward joint 68 allows the PPTA torch to move in a rotational direction 70 about the forward joint axis. Alternative embodiments of the robot may have greater or fewer numbers of joints than shown in FIGS. 6 and 7. Also, alternative embodiments may have different configurations using different types of joints.

Figure 8:
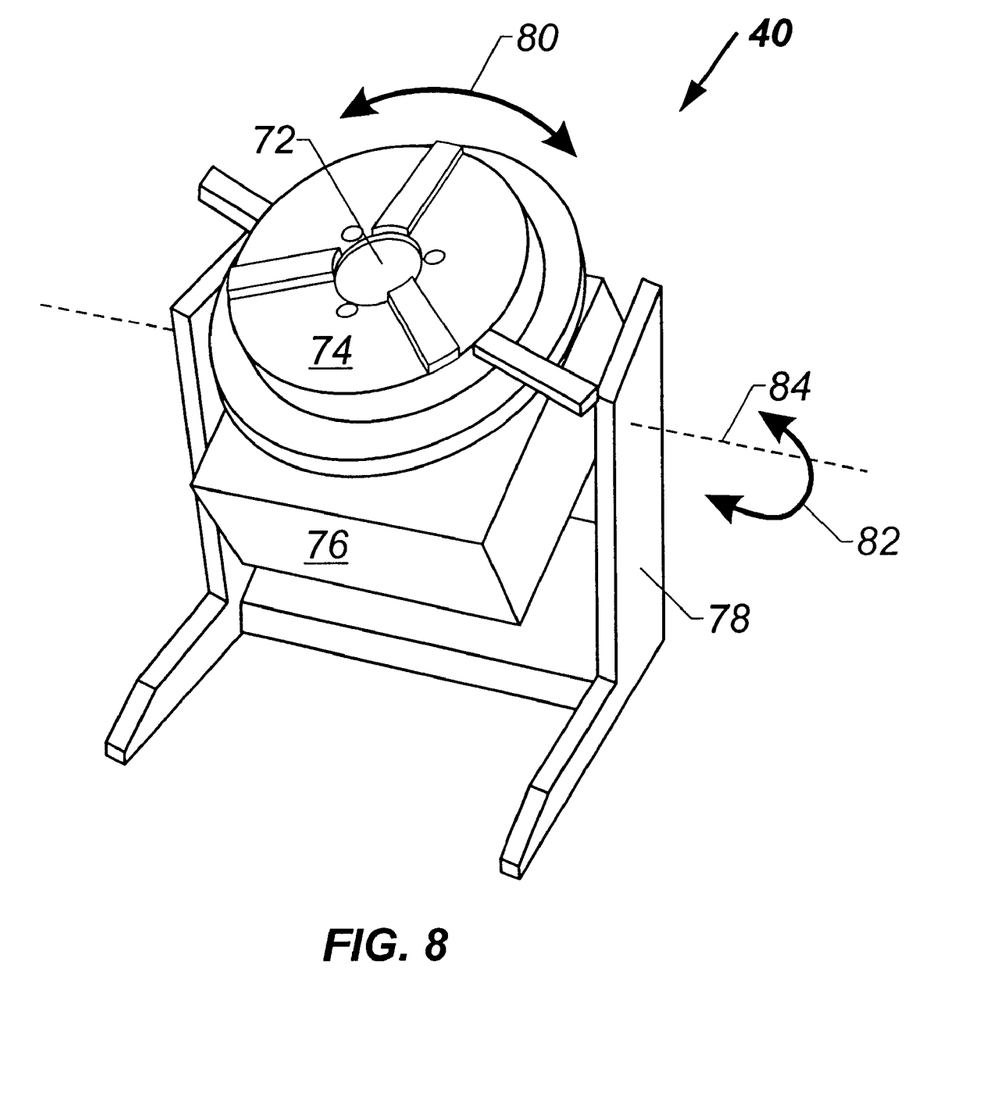
FIG. 8 is a perspective view of an embodiment of a positioner.

FIG. 8 shows a perspective view of an embodiment of a positioner. The positioner comprises a rotational disc 74 that is mounted on a tilting base 76. The tilting base is supported by a frame 78 which sits on the ground. A coupling 72 is positioned in the rotational disc 74. This coupling 72 serves to hold a milled-tooth cone in place. In alternative embodiments, the positioner can hold the PPTA torch while the milled-tooth cone is held by the robot. The rotational disc 74, when holding a milled-tooth cone, allows the cone to move in the rotational direction 80 of the disc. The tilting base 76 allows the cone to move in the tilting direction 82 of the base about the axis of the base 84.

During operation of the above embodiment, the positioner holds a milled-tooth cone with its nose pointing in the z-axis. The robot positions the torch in the desired location through movement in the x-, y-, and z-axes. Meanwhile, the positioner tilts the cone around the y-axis until the surface of tooth is at a predetermined stand-off distance from the PPTA torch. Once the proper stand-off distance is obtained, the PPTA torch commences the hardfacing along the desired surface of the tooth. The robot moves the PPTA torch along the appropriate axes of movement while maintaining the desired stand-off off distance from the surface of the tooth. When the hardfacing of the surface is completed, the positioner rotates the cone in the z axis to accomplish hardfacing of another tooth in the same row. In this example, the robot, which controls the PPTA torch, only requires three axes of movement which are the x-, y-, and z-axes. The positioner, which controls the milled-tooth cone, only requires two axes of movement which are the y-tilt axis and the z-rotation axis. Of course, it should be realized that the number of axes movement for the positioner and the robot are not limited to the description of this example of an embodiment. Furthermore, the preferred minimum number of five axes of movement can be distributed in various other combinations between the robot and the positioner.

After a milled-tooth cone is hardfaced, it may be incorporated into a rock bit for drilling applications. A rock bit according to embodiments of the invention has a similar construction to the one shown in FIG. 1, except that a milled-tooth cone hardfaced in the above-described manner is used. The rock bit generally includes a bit body with one or more legs. The hardfaced milled-tooth cone is rotatably mounted on the leg. Such rock bits may have a higher rate of penetration and longer lifetime due to the improved quality of hardfacing.

In addition to a milled-tooth cone, the automated hardfacing system may be used to hardface roller cones with tungsten carbide inserts (also referred to as TCI cones). A TCI cone includes a metallic cone (e.g., steel) with tungsten carbide inserts protruding from the surface of the cone. The body portions of the tungsten carbide inserts are pressed into insert holes formed in the cone by interference fit. Because the metallic cone is relatively soft, it is susceptible to erosion and wear. Therefore, it is desirable to hardface the metallic surface of a TCI cone. The metallic surface between two adjacent inserts in the same row is referred to in the art as the land, and the metallic surface between two adjacent rows of inserts is referred to as the groove. Both the land and the groove may be hardfaced by the automated hardfacing system. Furthermore, in some circumstances, it also may be desirable to hardface the tungsten carbide inserts with a more wear resistant composition.

As described above, embodiments of the invention provides an automated hardfacing system which is capable of producing hardfaced milled-tooth cones with improved quality. The improvements may include uniform thickness and uniform overage, reduced porosity, and reduced oxide content. These improvements should, in turn, lead to better performance of rock bits using the hardfaced milled-tooth cones. Other advantages are apparent to a person of ordinary skill in the art.

While the invention has been disclosed with reference to a limited number of embodiments, numerous variations and modifications therefrom are possible. For example, the automated hardfacing system may be used to hardface any work piece with complex geometry, not just milled-tooth cones. Any roller cone with protruding teeth may be hardfaced by the automated hardfacing system. The protruding teeth either may be integral with the roller cone like a milled-tooth cone or may be pressed into the roller cone like a TCI cone. Furthermore, hardfacing is not limited to the protruding teeth. The surface of a roller cone also may be hardfaced. Although embodiments of the invention is described with reference to linear and angular motion, it should be understand that they are preferred methods to practice the invention in an efficient and economical manner. It should be realized that any angular motion may be achieved by convoluted linear motions because the correlation between the polar coordinate system and the Cartesian coordinate system is known to exist. Consequently, convoluted linear motions that achieve the same result as an angular motion are deemed equivalent to that angular motion. Furthermore, it is apparent that any hardfacing method may be employed in the automated hardfacing system. It is intended that appended claims cover all such modifications and their variations as fall within the true spirit and the scope of the invention.

What is claimed is:

1. A method for hardfacing a roller cone of a drill bit comprising:

providing a roller cone having a protruding tooth and a hardfacing torch;

moving the roller cone by using a first apparatus having m axis (axes) of movement;

moving the hardfacing torch by using a second apparatus having n axis (axes) of movement, wherein $m+n \geq 5$; and depositing a hardfacing composition on the tooth of the roller cone with the hardfacing torch.

2. The method of claim 1, wherein the first apparatus is selected from the group consisting of a positioner and a robot.

3. The method of claim 1, wherein the second apparatus is selected from the group consisting of a positioner and a robot.

4. The method of claim 1, wherein m is one or greater.

5. The method of claim 1, wherein n is one or greater.

6. The method of claim 1, wherein the hardfacing composition is deposited by a plasma transferred arc process.

7. The method of claim 1, wherein the hardfacing composition is deposited by a pulsed plasma transferred arc process.

8. The method of claim 1, wherein the hardfacing composition is deposited by a metal inert gas arc process.

9. The method of claim 1, wherein the hardfacing composition is deposited by a gas tungsten arc welding process.

10. A method for hardfacing a milled-tooth cone of a drill bit comprising:

providing a milled-tooth steel cone having a plurality of steel teeth, each steel tooth having at least a face;

providing a hardfacing torch having a tip;

moving the milled-tooth steel cone by a positioner;

moving the hardfacing torch tip to an area adjacent to the face of a steel tooth of the milled-tooth cone by a robot;

forming a plasma column between the hardfacing torch tip and the face of the steel tooth;

feeding a hardfacing composition into the plasma column;

pulsing an electrical current at a pulse rate to deposit a layer of the hardfacing composition on the face of the steel tooth; and controlling the pulsing of the electrical current to minimize the formation of a weld pool on the face, wherein the hardfacing composition is deposited on the steel teeth by coordinating the movement of the positioner and the holder.

11. A hardfaced roller cone manufactured by the method comprising:

providing a hardfacing torch and a roller cone having a protruding tooth;

moving the roller cone by using a positioner having m axis (axes) of movement;

moving the hardfacing torch by using a holder having n axis (axes) of movement, wherein $m+n \geq 5$; and depositing a hardfacing composition on the tooth of the roller cone with the hardfacing torch.

12. The hardfaced roller cone of claim 11, wherein the tooth is formed of steel.

13. The hardfaced roller cone of claim 11, wherein the hardfacing composition includes tungsten carbide and a metal matrix.

14. The hardfaced roller cone of claim 11, wherein the hardfacing composition is deposited by a transferred plasma arc process.

15. The hardfaced roller cone of claim 11, wherein the hardfacing composition is deposited by a pulsed transferred plasma arc process.

16. The hardfaced roller cone of claim 11, wherein the hardfacing composition is deposited by a metal insert gas arc process.

17. The hardfaced roller cone of claim 11, wherein the hardfacing composition is deposited by a gas tungsten arc welding process.

18. A rock bit, comprising:

a bit body having a leg, and a hardfaced roller cone rotatably mounted on the leg, the hardfaced roller cone manufactured by the method comprising:

providing a hardfacing torch and a roller cone having a protruding tooth;

moving the roller cone by using a positioner having m axis (axes) of movement;

moving the hardfacing torch by using a holder having n axis (axes) of movement, wherein $m+n \geq 5$; and depositing a hardfacing composition on the tooth of the roller cone with the hardfacing torch.

* * * * *

US006392190C1

(12) EX PARTE REEXAMINATION CERTIFICATE (8440th)
United States Patent
Sue et al.

(10) Number: US 6,392,190 C1
(45) Certificate Issued: Aug. 2, 2011

(54) AUTOMATED HARDFACING SYSTEM

(75) Inventors: J. Albert Sue, The Woodlands, TX (US); Zhigang Fang, The Woodlands, TX (US); Alysia Canson White, Kingwood, TX (US)

(73) Assignee: Smith International, Inc., Houston, TX (US)

Reexamination Request:
No. 90/009,341, Nov. 24, 2008

Reexamination Certificate for:
Patent No.: 6,392,190
Issued: May 21, 2002
Appl. No.: 09/153,676
Filed: Sep. 15, 1998

Related U.S. Application Data (60) Provisional application No. 60/072,275, filed on Jan. 23, 1998.

(51) Int. Cl.
*B23K 10/00* (2006.01)

(52) U.S. Cl. ............... 219/121.59; 175/327; 175/375; 219/76.16; 219/121.47; 219/121.54; 427/445; 427/446

(58) Field of Classification Search ............... 219/76.16, 219/121.47, 121.54, 121.59; 427/446
See application file for complete search history.

(56) References Cited

U.S. PATENT DOCUMENTS

| | | | | |
|---|---|---|---|---|
| 3,892,882 A | * | 7/1975 | Guest et al. ................. | 427/446 |
| 4,370,538 A | * | 1/1983 | Browning ............... | 219/121.59 |
| 4,376,793 A | * | 3/1983 | Jackson ....................... | 427/451 |
| 4,414,029 A | * | 11/1983 | Newman et al. .............. | 75/252 |
| 4,689,463 A | * | 8/1987 | Shubert ................... | 219/76.16 |
| 4,836,307 A | | 6/1989 | Keshavan et al. | |
| 5,051,112 A | * | 9/1991 | Keshavan et al. ............. | 51/309 |
| 5,254,923 A | * | 10/1993 | Kanitani ................ | 318/568.11 |

OTHER PUBLICATIONS

Howard B. Cary, ARC Welding Automation, 1995, 544 Pages, Marcel Dekker, Inc., New York, NY—ISBN 0824796454, 9780824796457.

* cited by examiner

*Primary Examiner*—Jimmy G. Foster (57) ABSTRACT

An automated hardfacing system useful for hardfacing roller cones is disclosed. The automated system includes a robot with an arm, a positioner, and a controller which co-ordinates the alignment of the robot and the positioner. The robot holds a hardfacing torch and is capable of movement in three axes of movement. These axes are the x, y, and z axes of the Cartesian co-ordinate system. The positioner holds a roller cone and is capable of movement in at least two axes of movement. The movement includes tilting and rotation about a Cartesian axis. The hardfacing coating produced by the automated system has improved quality and consistency as compared to the one obtained by a manual process.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-18 are cancelled.

* * * * *